United States Patent [19]
Fordyce

[11] Patent Number: 4,856,715
[45] Date of Patent: Aug. 15, 1989

[54] LETTUCE TEARING MACHINE

[76] Inventor: Donald E. Fordyce, 5337 Bastille, El Paso, Tex. 79924

[21] Appl. No.: 62,106

[22] Filed: Jun. 12, 1987

Related U.S. Application Data

[63] Continuation-in-part of Ser. No. 773,651, Sep. 9, 1985, abandoned.

[51] Int. Cl.$^4$ ............................................. B02C 19/12
[52] U.S. Cl. ...................................... 241/5; 241/86.1
[58] Field of Search ............... 99/495, 537, 513, 511; 426/518, 481; 241/91, 92, 93, 30, 5, 28, 86.1

[56] References Cited

U.S. PATENT DOCUMENTS

| | | | |
|---|---|---|---|
| 1,561,401 | 11/1925 | Bembina | 241/93 X |
| 2,856,977 | 10/1958 | Hughes | 241/86.1 |
| 3,162,384 | 12/1964 | Wright | 241/86.1 |
| 4,114,286 | 9/1978 | Bingham . | |

FOREIGN PATENT DOCUMENTS

0114766A2 8/1984 European Pat. Off. .............. 241/91

Primary Examiner—Mark Rosenbaum
Attorney, Agent, or Firm—Marcus L. Bates

[57] ABSTRACT

Heads of lettuce are mechanically torn into bite size portions. Each head of lettuce is washed, the outer leaves and core removed, and the cleaned heads are introduced one at a time into a rotating cylindrical basket. The basket upwardly opens and has holes formed in a sidewall thereof of a size to admit torn bite size pieces of lettuce therethrough. The basket rotates about a vertical axis at a speed that engages and tears the heads of lettuce into the bite size pieces. A catching bowl is placed concentrically about the basket and in spaced relationship thereto. The bowl receives the torn lettuce that is thrown through the wall of the rotating basket.

16 Claims, 2 Drawing Sheets

LETTUCE TEARING MACHINE

REFERENCE TO RELATED PATENT APPLICATIONS

This patent application is a continuation-in-part of my copending patent application Ser. No. 773,651 filed Sept. 9, 1985, entitled "A Lettuce Tearing Machine" now abandoned.

BACKGROUND OF THE INVENTION

A cafeteria or fast food service will consume a large number of heads of lettuce each day. The lettuce is used in salads, and other foods. Lettuce is easily cut into fragments that are bite size; however, people do not like cut lettuce because it is difficult to manipulate with a fork. Therefore, the lettuce, especially when used at a salad bar, must be torn into bite size portions. This is time consuming and is also a potential source of contamination because the head of lettuce must be intimately handled by the person preparing the torn lettuce. It would therefore be more sanitary and less costly if the intact or whole head of lettuce could be washed, the core and any unwanted outer leaves removed, and then mechanically torn into suitable bite size portions. This avoids any subsequent, intimate human contact with the cleaned head of lettuce. Method and apparatus for achieving this desirable goal is the subject of the present invention.

SUMMARY OF THE INVENTION

An upwardly opening cylindrical wire basket has openings formed therein of a size to produce bite size portions of lettuce when a head of lettuce is reduced in size and forced through the openings. This is accomplished by judiciously selecting the size of the openings in the basket, the basket diameter, and the speed of rotation of the basket. The basket is rotated at a sufficiently high speed to create enough centrifugal force to cause the interaction between the stationary head of lettuce and the basket to effectively tear a head or bunch of lettuce apart as it contacts the rotating inner wall surface of the basket and then is forced through the bite size openings. The bite size pieces of lettuce are torn from the head as a result of the head being forced against the inside surface of the wire basket and through the openings as the torn lettuce is thrown into a stationary catching bowl. The wire that forms the rotating wire basket therefore contacts the stationary head of lettuce and causes the lettuce to be torn and not cut. Accordingly, the present invention is a lettuce tearing machine as opposed to a cutting machine.

A primary object of this invention is the provision of a lettuce tearing machine which is designed to save millions of man hours in the tedious preparation of lettuce which heretofore has been achieved by tearing each head or bunch by hand.

Another object of this invention is the provision of a more sanitary method of preparing lettuce wherein after the head of lettuce is rinsed, it is put into a spinning basket, where it does not have to be handled by human hands. The spinning basket interacts with the head of lettuce in a manner that causes the lettuce to be torn into bite sizes and forced through openings therein, and into a catching bowl therefor. The basket and bowl are easily removed for cleaning purposes.

These and various other objects and advantages of the invention will become readily apparent to those skilled in the art upon reading the following detailed description and claims and by referring to the accompanying drawings.

The above objects are attained in accordance with the present invention by the provision of a method for use with apparatus fabricated in a manner substantially as described herein.

DETAILED DESCRIPTION OF THE PREFERRED EMBODIMENT

Figure 1:
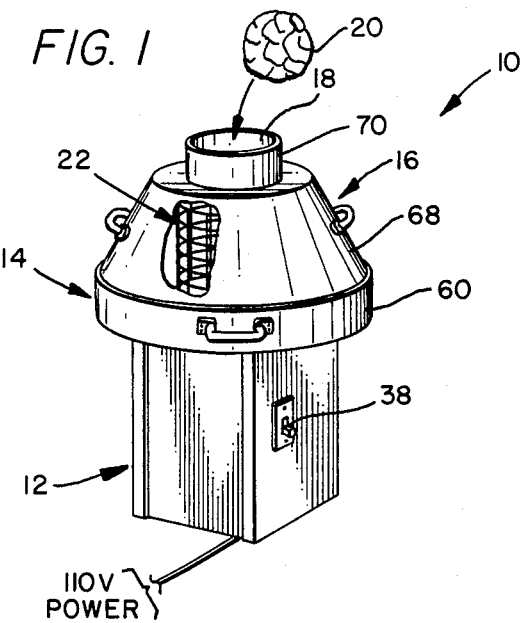
FIG. 1 is a perspective view of a lettuce tearing machine made in accordance with the present invention, with some parts being removed therefrom, and with the lettuce tearing machine shown in operation.
Figure 2:
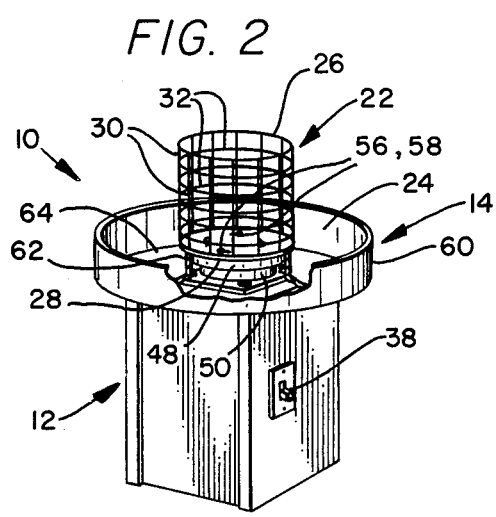
FIG. 2 is an enlarged view of the machine of FIG. 1, with some parts being removed therefrom so as to disclose the interior thereof.

In the figures of the drawings, there is disclosed a lettuce tearing machine 10 made in accordance with the present invention. The apparatus 10 includes a base 12 in the form of an enclosed framework which supports an annular catching bowl 14. The bowl 14 slidably receives the lower marginal end of a conical enclosure 16 therewithin. The conical enclosure upwardly extends from the bowl and provides a reduced diameter inlet 18 at the top thereof through which ordinary commercially available heads of lettuce 20 can be tossed.

A cylindrical stainless steel wire basket 22 is rotatably supported within the interior of the enclosure provided by the bowl and conical member 14 and 16. The wire basket 22 has an open upper end axially aligned with inlet 18 through which the heads of lettuce 20 can be introduced about as fast as one would care to toss them, which amounts to about one second intervals.

Numeral 24 indicates the interior of the catching bowl 14. The uppermost end 26 of the wire basket 22 forms the opening which is opposed to a lower plate member 28. The plate member 28 is a circular disk made of stainless steel metal to which there is attached the illustrated vertical wires 30. The horizontal wires 32 are attached to the vertical wires 30. The wires 30, 32 form openings 72 which are about two inches long and about three-quarters of an inch high. The wires 30, 32 preferably are solid one-eighth inch stainless steel members affixed to one another at the many intersections thereof.

The base 12 includes a plurality of support legs 34 which extend from the apparatus and preferably are enclosed by the illustrated sheet metal. Motor 36 is electrically connected to switch 38, which in turn is connected to a suitable source of electrical current. A motor support plate 40 is concentrically arranged in parallel relationship respective to a bearing support plate 42. The support plates 40, 42 are held in spaced relationship by means of radially spaced spreader tubes 44. A drive coupling 46 underlies a basket drive 48. The basket drive 48 is located above a bearing assembly 50, and the bearing assembly 50 is supported within the bearing support plate 42. Motor drive shaft 52 rotatably drives the drive coupling 46 which in turn drives a shaft 54 which is connected to the basket drive 48. The drive shafts 52, 54 lie along the indicated vertical, central, longitudinal axis of the apparatus.

Latch means 56, 58 can take on any number of different forms so long as it enables the basket 22 to be removably received in axially aligned relationship respective to the basket drive 48. The latch means preferably are a plurality of spaced bonnet headed screws which are received within the radially spaced tear drop apertures 58 so that the basket can be released and lifted from the upper face of the basket drive 48.

The catching bowl 14 has an outer vertical wall 60 spaced from an inner vertical wall 62, thereby forming an annular lettuce storage chamber 64 therewithin. Lower skirt 66 of the conical enclosure 16 is slidably received within the upstanding wall member 60 of the catching bowl 14.

Figure 3:
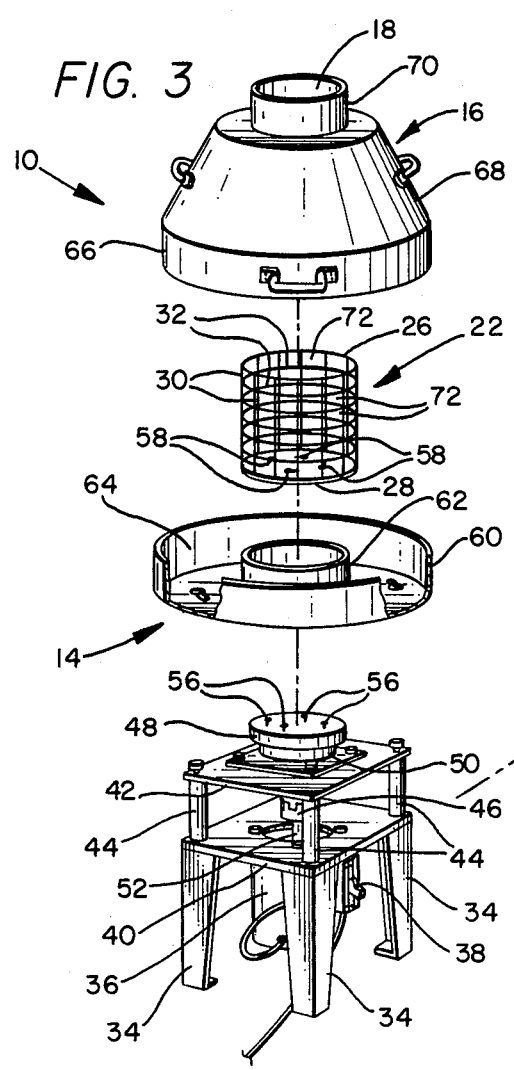
FIG. 3 is a disassembled view of the apparatus disclosed in FIGS. 1 and 2, with some parts being removed therefrom in order to better disclose the invention.
Figure 4:
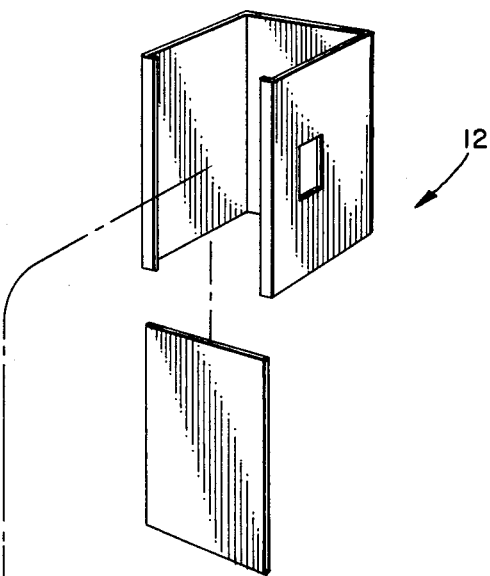
FIG. 4 is a fragmentary, top, plan view of part of the apparatus disclosed in FIG. 3.
Figure 4:
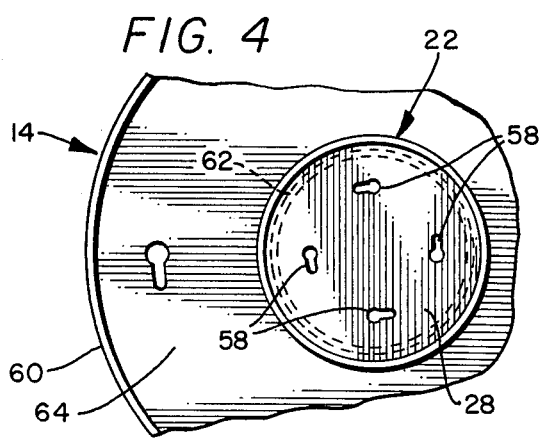
Figure 5:
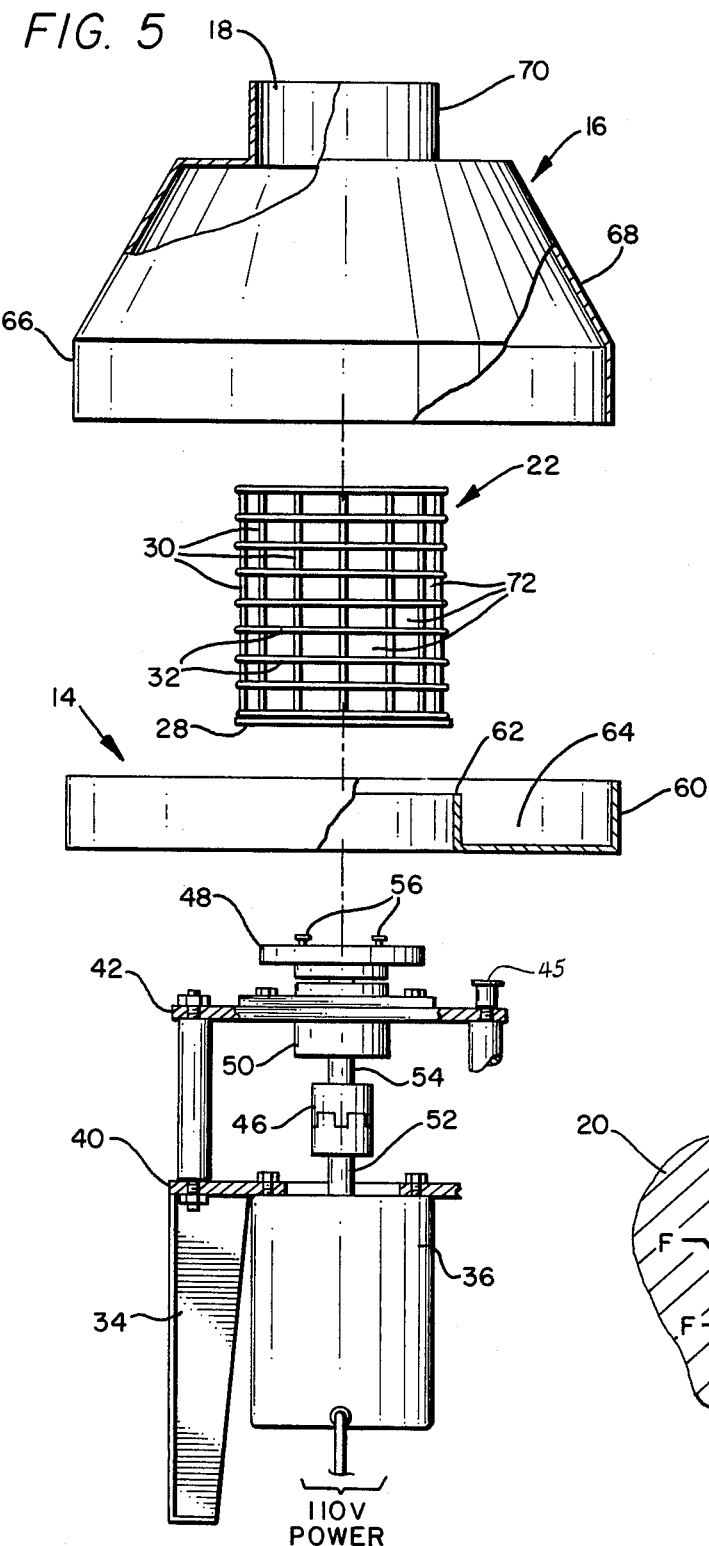
FIG. 5 is an exploded view of the apparatus disclosed in the foregoing figures, with some parts being removed therefrom and some of the remaining parts being shown in cross-section; and, FIG. 6 is a diagrammatical illustration showing a head of lettuce being torn into bite size pieces.

As seen in FIG. 3, the upper enclosure member 16 includes an upwardly converging conical wall 68 which forms a frustum of a cone. The upper end of the wall 68 terminates in a reduced diameter upper skirt member 70 which forms inlet 18 through which heads of lettuce 20 can be introduced one at a time into the enclosure and into the basket.

The catching bowl 14 is telescopingly received about the wire basket 22 in close tolerance relationship with respect to the lower plate member 28. The plate member 28 is rotatably positioned at the upper marginal end of the inner vertical wall 62 so that the lowermost openings 72 of the wire basket 22 are spaced above the upper edge portion of the inner wall 62.

The bottom or lower wall surface of the catching bowl 14 is provided with circumferentially spaced apertures which register with the four bolts extending through the tubes 44. The bowl 14 therefore is releasably captured and bottom supported by the plate 42 and easily removed therefrom. The wire basket 22 is received in axial aligned relationship respective to the inner passageway 62 of the catching bowl 14, with the annular storage chamber 64 circumferentially extending about the lower end of the wire basket 22, so that torn lettuce gravitates into the annular chamber 64. The upper conical part 16 of the cover is slidably received within the catching bowl and is easily removed therefrom.

In operation, heads of lettuce are washed, the unwanted leaves and core removed, then the heads are dropped through the opening 18 about as fast as one desires because less than one second is required for one head of the lettuce to be processed by the apparatus 10.

In one form of the invention, a ½ horsepower motor 36 designed to run at a speed of 1720 rpm and therefore rotates the basket 22 at 1720 rpm was arranged in the manner of the figures of the drawings. The basket was made of one-eighth inch wire supported by a ¼ inch plate member 28, with the openings 72 being about 2 inches wide and about ¾ inches in height. The basket has an outside diameter of 8½ inches and is 8 inches tall.

The catching bowl 14 has an inside passageway 62 which measures slightly more than 8½ inches in diameter, an outside diameter 60 of 16 inches, and was 3 inches in height. The catching bowl 14 was made of stainless steel sheet metal and was removably supported by plate member 42 in the illustrated manner of FIG. 3. This catching bowl will easily hold five heads of lettuce.

The upper enclosure member 16 was provided with a skirt 66 having an inside diameter that is slidably received within skirt member or vertical wall 60 of bowl 14 and an upper inlet end 70 which is 8 inches inside diameter. This is adequate for receiving any head of commercially grown lettuce. The overall height of the bowl 14 and enclosure 16 is 14 inches.

The apparatus was assembled in the manner of FIG. 1. When the motor is energized, the wire basket comes up to speed within a second or so. The scrubbed heads of lettuce are dropped through the entrance 18 which requires a time lapse of about one second between heads of lettuce. This is within the capability of the apparatus disclosed herein. The disclosed embodiment of the invention will handle five heads of lettuce. After five heads of lettuce have been introduced through opening 18, the motor is deenergized, the upper enclosure member 16 is removed from the bowl 14, the catch bowl 14 is removed from the plate member 42 by telescoping the bowl 14 up over the wire basket 22. Most of the torn lettuce is stored within annular chamber 64. Some lettuce will cling to the inside peripheral wall surface of the upper enclosure member 16 as well as the basket 22. This lettuce can be ignored until the last of the lettuce has been processed, at which time these few pieces can be gathered and placed with the other torn lettuce.

Figure 6:
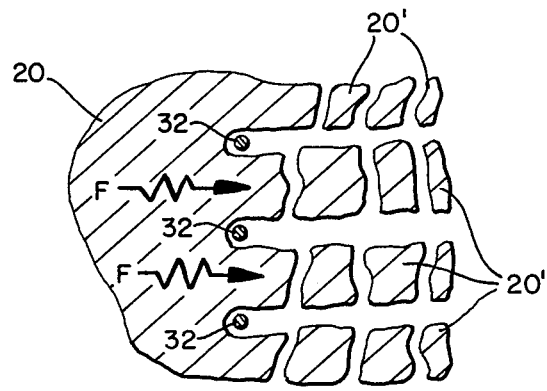

The bowl 14 is replaced on plate member 42, with the boltheads 45 extending through the aligned aperture in the lower face of the bowl. This axially aligns the catch bowl 14 with the longitudinal axial centerline of the apparatus. The upper enclosure 16 is replaced within the catching bowl 14 and another five heads of lettuce are processed or torn in the above described manner FIG. 6 illustrates the inventor's theory of operation. Commercially available heads of lettuce 20, such as ordinarily purchased in the supermarket, are prepared and then introduced through opening 18 in about one second intervals. The heads of lettuce are dropped at 18 and fall by gravity to the interior of the rotating wire basket 22. The inner wall surface of the rotating wire basket contacts the falling head of lettuce and the relative moving surfaces tend to accelerate the head of lettuce, while the wire basket 22 is momentarily slightly decreased in speed as energy is exchanged between the basket and the head of lettuce. This action which takes place between the rotating wire basket and the relatively stationary head of lettuce is believed to produce the theoretical action hypothetically set forth in FIG. 6. In FIG. 6, the horizontal wires 32, which are three-quarters of an inch apart, permit torn pieces of lettuce 20' to be forced therethrough. The vertical wires 30 engage the heads of lettuce with relatively great speed and tear the pieces of lettuce 20' from the surface thereof. At the same time, the head of lettuce, being contacted on one side by the rotating basket 22, no doubt tends to rapidly accelerate in a rotational manner so a new side or surface of the lettuce is rotatably brought into intimate contact with the rotating wire surface as centrifugal force urges the head of lettuce into engagement with the surface presented by the wires 30, 32. Accordingly, the head of lettuce is subjected to a very complex number of different forces that are brought to act on the head of lettuce from a number of different directions, causing the slower moving head of lettuce to wipingly engage the inside peripheral surface of the wire basket 22 while being forced outward with increased apparent weight due to the centrifugal force presented by the basket while at the same time, the wires 30, 32 embed themselves into the outer surface of the lettuce, thereby pulling and tearing bite size pieces from the head of lettuce in the manner illustrated in the hypothetical FIG. 6.

On the other hand, when a head of lettuce is placed into a non-rotating wire basket, and then rotated, the operation is entirely unsatisfactory and the apparatus vibrates excessively due to the imbalance induced by the accelerated head of lettuce.

Furthermore, a basket speed of 1120 rpm has been found inadequate. The preferred speed of 1720 rpm could no doubt be slightly increased or decreased. The horsepower could probably be reduced and still carry out the present method; however, the time interval between heads of lettuce processed may be increased if the power is substantially decreased.

I claim:

1. Method of tearing heads of lettuce into bite size portions comprising the steps of:
   (1) mounting two concentric containers, one within the other, to provide an upwardly opening, inner rotatable container and an outer container; with the inner and outer containers being spaced apart to provide an annular storage area therebetween;
   (2) there being perforations within the sidewall of the inner container of a size to tear the heads of lettuce into the bite size pieces when the inner container is rotated and the heads of lettuce are dropped into the rotating inner container;
   (3) gravitating a head of lettuce through the opening and into the inner container, and
   (4) accelerating the head of lettuce by rotating the inner container at a rotational velocity to force a head of lettuce dropped into the inner container to bear against the sidewall of the inner container with sufficient force to tear the smaller bite size pieces of lettuce from a head of lettuce as the head of lettuce is accelerated by the inner container due to the head of lettuce being accelerated solely by the inner container;
   (5) moving the bite size pieces through said perforations and against the inner wall of the outer container and gravitating the pieces towards the bottom of the annular storage area.

2. The method of claim 1 and further including the step of using an inner container having spaced wires that form openings therebetween through which the bite size pieces of torn lettuce pass and are thrown against the outer container.

3. The method of claim 2 and further including the step of making the outer container removably attached to a support stand; and, locating said annular storage chamber below said inner container so that the torn bite size lettuce accumulates therein; removably mounting the outer container respective to the inner container so that the outer container can be removed and the bite size lettuce dispensed therefrom.

4. The method of claim 3 wherein the wires of the inner container are spaced apart to form an opening which is about 2 inches long and ½ inch wide, said inner container is about 8 inches inside diameter and rotated at 1720 rpm.

5. Method of tearing large pieces of lettuce into smaller bite size portions, comprising the steps of:
   (1) mounting an upwardly opening perforated basket within a container in concentric relationship with respect to one another and along a common axis to form an inner basket and an outer container; with the inner basket and outer container being spaced apart to provide an annular storage chamber therebetween;
   (2) perforations of said perforated basket are placed in the sidewall of the basket and are of a size to admit the smaller bite size portions to be forced therethrough;
   (3) gravitating a large piece of lettuce through the opening in the inner basket while rotating the inner basket at a rotational velocity to accelerate the large piece of lettuce and force it against the sidewall of the inner basket with sufficient force to tear the large piece into the smaller bite size portions due to the large piece being centrifugally forced against the inner basket solely by weight of the large piece of lettuce;
   (4) passing the bite size portions through the perforations and throwing the smaller bite size portions against the wall of the outer container and gravitating the bite size portions into the annular storage area.

6. The method of claim 5 and further including the step of making the inner basket of spaced wires which form openings therebetween through which the lettuce that has been torn into bite size portions are thrown against the outer container.

7. The method of claim 6 and further including the step of attaching the outer container in a removable manner to a support stand; and, accumulating the bite size portions of lettuce within said annular storage chamber so that the outer container can be removed and the bite size lettuce dispensed therefrom.

8. The method of claim 7 and further including the step of making the inner wire basket removably secured to a drive means.

9. Method of tearing a head of lettuce into bite size portions, comprising the steps of:
   (1) concentrically mounting an upwardly opening rotatable perforated container within a housing to provide an inner rotatable container and an outer container; with the inner and outer containers being spaced apart to provide an annular storage area therebetween;
   (2) there being perforations within the sidewall of the inner container of a size to pass the bite size portions therethrough when the inner container is rotated and the head of lettuce is torn into bite sizes;
   (3) rotating the inner container and dropping a head of lettuce into the inner container and centrifugally forcing the head of lettuce to bear against the sidewall of the inner container with sufficient force to tear the smaller bite size portions of lettuce from a head of lettuce due solely to the head of lettuce being accelerated by the sidewall of the inner container;
   (4) moving the smaller bite size portions through said perforations and against the inner wall of the outer container and gravitating the pieces towards the bottom of the annular storage area.

10. The method of claim 9 and further including the step of using an inner container having a sidewall made of spaced wires that form openings therebetween through which the bite size portions of torn lettuce pass and are thrown against the outer container.

11. The method of claim 10 and further including the step of removably attaching the outer container to a support stand; and, locating part of said annular storage chamber below said inner container so that the torn bite size lettuce accumulates therein; removably mounting the outer container respective to the inner container so that the outer container can be removed and the bite size lettuce dispensed therefrom.

12. The method of claim 11 wherein the wires of the inner container are spaced apart to provide an opening which measures about one by one-half inches in size, said inner container is 8 inches inside diameter, and is rotated at 1720 rpm.

13. Method of tearing a head of lettuce into bite size portions, comprising the steps of:
   rotatably supporting an upwardly opening perforated container about an axis, the opening into said container being of a size to freely admit a head of lettuce thereinto;
   selecting the size of the perforations to provide a plurality of perforations in a sidewall of the container through which the bite size portions can pass;
   rotating said container at a rotational velocity to provide sufficient force for tearing the lettuce into the bite size portions when the head of lettuce is accelerated by the perforated side wall of the rotating container;
   dropping a head of lettuce into said rotating container; gravitating the head of lettuce into engagement with the perforated side wall of the interior of the rotating container and accelerating the head of lettuce as it engages the perforations of the perforated container due to the centrifugal force of the rotating container whereby energy is dissipated between the head of lettuce and the perforations which is of a magnitude to tear the head of lettuce into the bite size portions due solely to the head of lettuce being accelerated by the rotating container;
   passing the bite size portions of lettuce through the perforations and collecting the bite size portions at a location spaced from the perforated container.

14. The method of claim 13 and further including the step of axially aligning an outer container with respect to the perforated container and surrounding the inner perforated container with said outer container;
   selecting an inner container having perforations formed by spaced wires that form openings therebetween through which the bite size portions of torn lettuce pass and are subsequently thrown against the outer container.

15. The method of claim 13 and further including the step of removably attaching an outer container to a support stand; and, locating an annular storage chamber below said perforated inner container so that the torn bite size lettuce accumulates therein; removably mounting the outer container respective to the inner container so that the outer container can be removed and the bite size lettuce dispensed therefrom.

16. The method of claim 13 wherein the inner container is formed of wires; the wires of the inner container are spaced apart to form the perforations which are in the form of an opening which is about 2 inches and ½ inch wide, said inner container is about 8 inches inside diameter and is rotated at 1720 rpm.

* * * * *